[11] 3,582,750

| [72] | Inventor | Martin O. Halfhill<br>San Jose, Calif. |
|---|---|---|
| [21] | Appl. No. | 809,082 |
| [22] | Filed | Mar. 21, 1969 |
| [45] | Patented | June 1, 1971 |
| [73] | Assignee | Information Storage Systems, Inc.<br>Cupertino, Calif. |

[54] POWER DRIVER FOR REGULATING A SERVOMOTOR
10 Claims, 5 Drawing Figs.

[52] U.S. Cl. ................................................. 318/599,
  318/681
[51] Int. Cl. .................................................. G05b 11/28
[50] Field of Search........................................... 318/20.8,
  20.85, 20.290, 20.825, 20.835, 20.840, 341, 599, 681

[56] References Cited
UNITED STATES PATENTS

| 3,110,851 | 11/1963 | Plogstedt et al. | 318/29X |
| 3,213,343 | 10/1965 | Sheheen | 318/341 |
| 3,260,912 | 7/1966 | Gregory | 318/341 |
| 3,427,520 | 2/1969 | Oppedahl | 318/28X |
| 3,417,759 | 10/1969 | Broverman | 318/30X |

Primary Examiner—Benjamin Dobeck
Attorney—Robert B. Crouch

ABSTRACT: The present invention relates to a power driver for supplying current to a servomotor, including circuitry for continuously monitoring drive current in the motor, a comparator for comparing the drive current in the motor with a position error signal applied to the motor and circuitry for pulsing the motor at a high frequency whenever the error signal differs from the drive current.

PATENTED JUN 1 1971 3,582,750
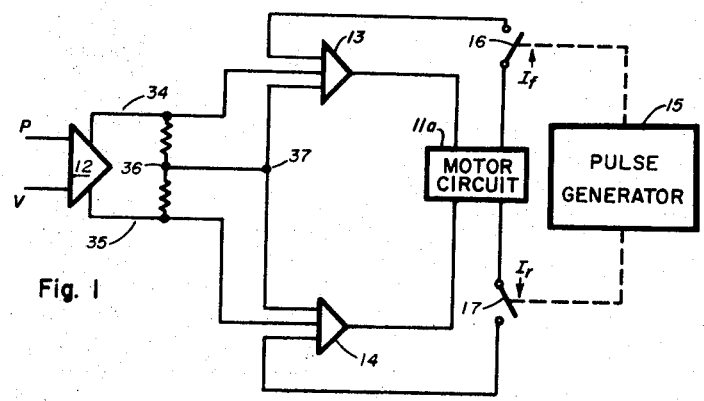
Fig. 1
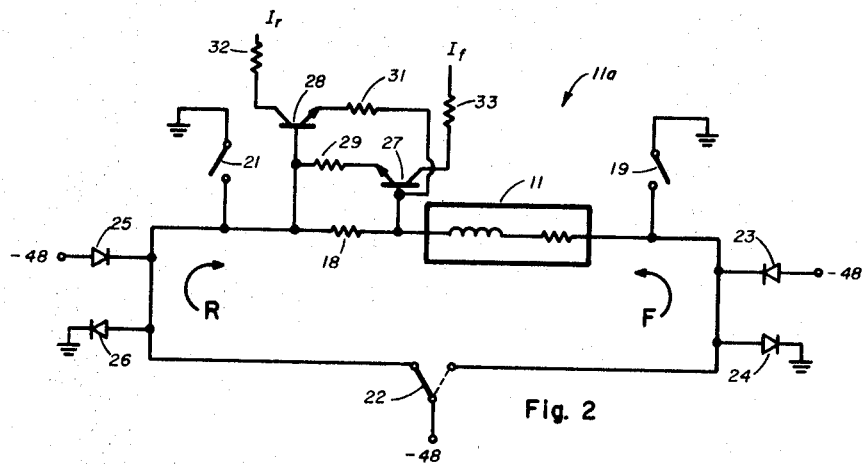
Fig. 2
Fig. 3
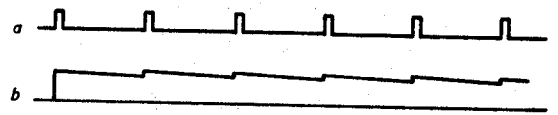
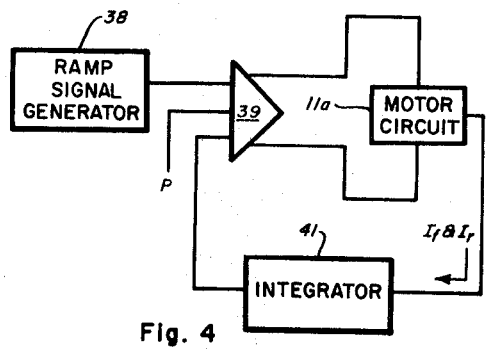
Fig. 4
Fig. 5
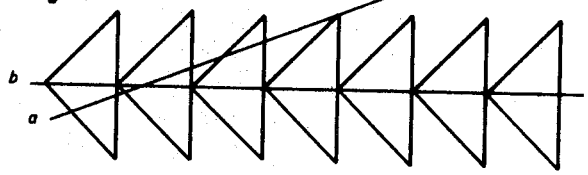
INVENTOR.
Martin O. Halfhill
BY
Robert B. Crouch

POWER DRIVER FOR REGULATING A SERVOMOTOR

BACKGROUND

In servo-controlled machines and systems it is well known to employ a power drive circuit to control the application of current from a power source to a servomotor. In such a system the power drive automatically switches the direction, and varies the amount, of current flow to the servomotor. In data processing machines, and particularly disc storage drives, the power drivers commonly used have been linear circuits. While such circuits allow linear operation of the overall system, the fact that the power is on all the time produces an inherent disadvantage of large power dissipation. Thus, expensive, high temperature circuit components have had to be provided to hold up under the elevated temperatures produced and extensive heat transfer and cooling equipment has been necessitated to conduct the heat to the atmosphere. In selected servo applications such as power amplifiers, etc. power drivers are known which employ pulse width modulation techniques wherein power is provided in the form of pulses at a given frequency in one direction or the other. However, such circuits have not been satisfactory for use in data processing applications since many of them involve large power dissipation, both in the components of the driver and in the system. In addition such circuits have operated at relatively low frequencies, i.e., in the audio range and are unsuitable for use in a data processing environment.

INVENTION

The present invention allows linear system operation of a servo-controlled mechanism without the shortcomings of the prior art devices. This is accomplished by the use of current feedback in conjunction with a pulsed power driver which is operated at a frequency approximately two orders of magnitude greater than the frequency of the control signal. The invention includes means for continuously monitoring current supplied to the motor in either direction, means for comparing the motor current with a position error signal applied to the motor and means for pulsing the motor in one direction or the other whenever the magnitude of the error signal differs from that of the motor current.

The foregoing and other objects, features and advantages of the invention will be apparent from the following more particular description of preferred embodiments of the invention as illustrated in the accompanying drawings, wherein:

FIG. 1 is a schematic view of a preferred embodiment of the power driver of the present invention;

FIG. 2 is a bridge motor circuit for measuring the motor current in the present invention;

FIG. 3 shows a series of waveforms which illustrate the operation of the embodiment of FIG. 1;

FIG. 4 is a schematic view of an alternate embodiment of the present invention; and FIG. 5 is a series of waveforms generated by the embodiment of FIG. 4.

The present invention makes use of a pulsed power drive using current feedback and a pulser frequency which is approximately 100 times that of the control frequency to achieve linear operation at the control frequency and below. This approach allows sampling at such frequent intervals that the servo effectively sees a continuous signal. With this approach, all power applied to the power driver is available for work since virtually no power is dissipated in the circuitry.

Referring to the drawing, the embodiment of FIG. 1 includes a motor circuit 11a with a motor 11, a summing amplifier 12, and a pair of comparators 13 and 14 connected between the motor and the summing amplifier. A pulse generator 15 is operatively connected to a pair of switches 16 and 17 in current feedback lines between the motor and the comparators 13 and 14. Circuitry for developing a current feedback signal from the motor is illustrated in FIG. 2 as including the motor 11 and a resistor 18 connected together in series in a bridge circuit. The bridge includes two connections to ground, through a first switch 19 and a second switch 21, located on opposite sides of the motor and resistor. A common connection 22 to a source of voltage can be switched to either side of the bridge. The side of the bridge adjacent switch 19 is connected through a diode 23 to the voltage source and through a diode 24 to ground. Similarly the opposite side of the bridge adjacent switch 21 is connected through a diode 25 to the voltage source and through a diode 26 to ground. A circuit for measuring the current in the bridge includes transistors 27 and 28 and resistors 29 and 31. The end of resistor 18 adjacent the motor is connected to the base of transistor 27 and through resistor 31 to the emitter of transistor 28. The end of resistor 18 removed from the motor is connected to the base of transistor 28 and through resistor 29 to the emitter of transistor 27.

In the operation of the motor circuitry of FIG. 2, switch 22 is moved to the solid line position, so that when switch 19 is closed current flows across the left side of the bridge through the resistor 18, the motor and switch 19 causing the motor to drive in the reverse direction. In this condition current applied to the base of transistor 28 causes it to conduct through a resistor 32 providing a current output signal $I_r$ which is a measurement of the current in the motor. Transistor 28 conducts in this condition since the voltage applied to the base is greater than that applied through resistor 31 to the emitter. At the same time transistor 27 is biased to the off position, since the voltage applied through resistor 29 to the emitter is greater than that applied to the base due to the voltage drop across resistor 18. When the switch 22 is moved to the dotted line position current flows in the right side of the bridge through the motor, the resistor 18 and switch 21 when it is closed to drive the motor in the forward direction. In this condition transistor 27 conducts providing an output $I_f$ through a resistor 33 which is a measurement of the current in the motor. At the same time transistor 28 is biased to its off position, since the voltage applied through resistor 31 to the emitter is greater than that applied to the base due to the voltage drop across resistor 18.

In the circuitry of FIG. 1 position error signals and velocity signals are applied to the summing amplifier which generates a differential output on lines 34 and 35. When the position error signal is larger than the velocity signal, line 34 is more positive than line 35 and when the velocity signal is larger than the position error signal line 35 is more positive than line 34. A voltage divider 36 is connected across lines 34 and 35 and a reference line 37 is connected to the midpoint of the voltage divider. Comparator 13 compares the current feedback signal $I_f$ with the position error signal on line 34 when line 34 is more positive than the reference line 37. Similarly, comparator 14 compares the current feedback signal $I_r$ with the position error signal on line 35 when line 35 is more positive than the reference line 37. The pulse generator 15 emits a 5-microsecond pulse every 50 microseconds, FIG. 3a, which opens the switches 16 and 17 in the current feedback line. This causes an imbalance in which ever of the comparators is controlling the drive of the motor. For example, if the motor is driving in the forward direction when switch 16 opens, it interrupts the current feedback signal $I_f$, causing an imbalance in the inputs to the comparator 13 which generates an output signal. The output signal closes switch 21 causing the application of full drive current in the motor. When switch 16 is closed and feedback signal $I_f$ is again applied to comparator 13 the inputs are balanced and the output signal is interrupted causing switch 21 to open again. As illustrated in FIG. 3 the pulses emitted by the pulse generator 15 are 5 microseconds long; however, the internal delays in the circuit components of the system are approximately 4 microseconds. Therefore, the full drive current is applied to the motor for a minimum of approximately 1 microsecond. Since the pulses are emitted every 50 microseconds, this means that full drive current is applied to the motor for at least 1 microsecond every 50 microseconds. When switch 22 is in the dotted line position and switch 21 is closed, the current level in the coil of the motor builds to a certain level. Due to the inductance of the coil the current level tends to stay constant, and drops off very slowly when a switch 21 is opened. In order to maintain a constant current level in the coil the voltage level at the end of the motor coil adjacent switch 21 kicks down to −48 volts which turns on diode 25 causing a constant voltage across the coil. The current then remains approximately constant and decays very little before the next pulse from pulse generator 15, as illustrated in FIG. 3b. In the absence of an unbalanced error signal on line 34 or 35 the motor drive will be as described. However, the existence of an unbalanced error signal while switches 16 and 17 are open will extend the period of motor drive, since switches 19 and 21 are closed by an output signal from the comparator caused by an imbalance between the inputs. While the pulse generator forces an imbalance by interrupting the current feedback, the imbalance continues until the balance is restored, i.e., until the current feedback again balances the error signal. Therefore the combined output signal from the comparators resembles the pulse train of FIG. 3a, except that the width of the individual pulses is proportional to the magnitude of the unbalanced signal. While the widths of the pulses vary, the frequency at which they occur remains constant as established by the pulse generator.

If switch 21 were closed and switch 22 opened, the end of the coil adjacent switch 19 would kick upward to ground level and would turn on diode 24, causing a constant voltage across the coil during the time that switch 22 was open. In the case of reverse drive, switch 17 causes an imbalance in comparator 14, which closes switch 19 causing the application of a full drive pulse in the reverse direction. When switch 19 is opened the end of the coil adjacent diode 23 kicks downward causing diode 23 to conduct. Similarly, when switch 19 is closed and switch 22 is opened, the end of the coil adjacent diode 26 kicks upward causing diode 26 to conduct. The use of a single connection 22 to the power source in combination with two connections to ground, 19 and 21, produces several advantages over the conventional bridge arrangement having two pairs of connections to power and ground. The single connection reduces electrical noise in the power driver by approximately 90 percent and avoids the necessity of synchronizing the closing of two switches, one to ground and one to power. It also avoids the oscillations which occur when the two are not in perfect synchronism and reduces the voltage kick in the motor coil by 50 percent in that only one end of the coil kicks when the switches 19 and 21 are opened and closed.

The embodiment of FIG. 1 can be simplified for use with low frequency servo systems, i.e., bandwidths of approximately 100 Hz., by omitting the pulse generator 15 and switches 16 and 17. With such a configuration a differential output from the summing amplifier is applied to the comparators along with a current feedback signal. When an imbalance occurs in one of the comparators a drive signal is generated to drive the motor in the proper direction. Due to the time delays in the circuits of the system the drive signal is applied for some finite time before the current in the motor builds up and is fed back to again produce a balance in the comparator. The drive is then switched to zero until the motor current decays enough to again produce an imbalance in the comparator and cause another drive signal. This process continues and the system effectively oscillates. The oscillation is effectively limited by the speed of conventional circuits such that this embodiment is presently suitable for low frequency servo systems. However with high speed circuits this embodiment would be usable in many of the applications of the embodiment of FIG. 1.

The embodiment of FIG. 4 includes a ramp generator 38, a summing amplifier 39 and an integrator 41. The summing amplifier provides a differential output to a servo motor circuit 11a to control the direction and amount of current flow to the motor. The drive current in the motor is measured by the circuitry of FIG. 2 and fed back through the integrator 41 to the summing amplifier where it is combined with a position error signal and the output from the ramp generator 38. Referring to FIG. 5, the position error signal, waveform 5a, is shown as a continuous, constant slope signal which is superimposed upon the ramp signal. The ramp generator produces a bidirectional ramp signal, waveform 5b and a reset signal, waveform 5c, the ramp signal being reset by each pulse in the reset signal. The integrated current feedback signal is shown at waveform 5d and the drive signal is shown in waveform 5e. The presence of a position error signal at the time the ramp is reset by the reset signal causes the system to apply full drive to the motor unit the error signal is balanced by the integrated motor current feedback. The motor drive is then switched to zero until the next reset pulse and the process repeated. In the summing amplifier the position error signal is combined with the integrated current feedback to produce a series of switching points on the ramp signal which are used to produce the motor drive signal of waveform 5e. The drive signal of waveform 5e consists of a sequence of pulses in which the leading edges are determined by the reset signals of waveform 5c and the trailing edges are determined by the switching points on the ramp signal of waveform 5b. As long as the switching points fall on the ramp signal the motor drive signal appears as a sequence of pulses at the frequency of the reset signal. When the switching points fall off the ramp the drive signal becomes continuous. In case of a large position error signal, such as shown at the right end of waveform 5a, the current feedback may not be of sufficient magnitude to balance the error signal prior to the next reset pulse, so the drive becomes continuous between reset pulses. The result is a high frequency pulsed drive signal in which the width of the individual pulses varies with the magnitude of the difference between the position error signal and the motor current.

The power driver of the present invention is suitable for use with DC motors, either rotary or linear. In either case, the movable coil of the motor is connected in the bridge of FIG. 2 in order to sense the drive current in the motor.

The various embodiments of the invention utilize conventional components to carry out the desired result. The switches 16, 17, 19, 21 and 22 are illustrated in diagrammatic form for the purpose of describing the invention. However, it is understood that power switch transistor (switches) or other high speed switching devices may be employed to satisfy the timing requirements of the circuit components shown.

Obviously, many modifications and variations of the present invention are possible in light of the above teachings. It is therefore to be understood that within the scope of the appended claims, the invention may be practiced otherwise than as specifically described.

I claim:

1. A power driver for supplying electrical current to a DC servomotor in response to an error signal, including:
    means for monitoring current in the motor and producing a feedback signal proportional to the amplitude and direction of motor drive current including a bridge circuit having an impedance including the motor coil and means for maintaining approximately a constant voltage level across the impedance during the time period drive current is not supplied to the motor, and
    second means for comparing the error signal and the feedback signal, the second means producing a drive signal to pulse the motor when an imbalance occurs between the error signal and the feedback signal.

2. A power driver as defined in claim 1 wherein:
    the second means produces a drive signal having a series of pulses of either polarity occurring at a regular frequency, the level of the signal returning to zero between successive pulses.

3. A power driver as defined in claim 2, wherein:
    the second means includes a ramp generator producing a ramp signal which is combined with the error signal and the feedback signal to produce the motor drive signal, and
    the pulses of the drive signal vary in width in direct proportion to the magnitude of the difference between the error signal and the feedback signal.

4. A power driver for supplying electrical current to a DC servomotor in response to an error signal, including:
   means for monitoring current in the motor and producing a feedback signal proportional to the amplitude and direction of motor drive current, and including a bridge circuit which includes a resistor and the movable coil of the motor connected in series, switch means for selectively pulsing the motor in either direction, and means for maintaining approximately a constant voltage level across the coil and resistor during the time period between pulses and power, and
   second means for comparing the error signal and the feedback signal, the second means producing a drive signal to pulse the motor when an imbalance occurs between the error signal and the feedback signal.

5. A power driver as defined in claim 2 wherein:
   the switch means includes a single switch connected to one side of the bridge for controlling the direction of current flow and a pair of switches connected to the other side of the bridge for controlling the duration of current flow.

6. A power driver for supplying electrical current to a DC servomotor in response to an error signal, including:
   means for monitoring current in the motor and producing a feedback signal proportional to the motor drive current,
   second means for comparing the error signal and the feedback signal, the second means producing a drive signal to pulse the motor when an imbalance occurs between the error signal and the feedback signal,
   the second means including amplifying means for producing a differential output indicating direction and magnitude of position error, and
   comparator means connected between the amplifying means and the motor, the comparator means receiving as inputs the output from the amplifying means and current feedback signals from the first means.

7. A power driver as defined in claim 6, wherein;
   the amplifying means produces a first signal-indicating magnitude of position error in one direction and a second signal-indicating magnitude of position error in the opposite direction,
   the first means produces a first feedback signal proportional to motor current in one direction and a second feedback signal proportional to motor current in the opposite direction, and
   the comparator means includes one comparator connected to receive the first signal from the amplifying means and the first feedback signal and another comparator connected to receive the second signal from the amplifying means and the second feedback signal.

8. A power driver as defined in claim 6 which includes:
   means for periodically interrupting the current feedback signal to the comparator means at a frequency of at least 20 times the highest frequency of interest in the control system.

9. A power driver as defined in claim 8 wherein:
   the last named means produces an interruption signal which is slightly longer than the internal delays of the power driver circuit components and approximately 10 percent of the period between interruption signals.

10. A power driver for supplying electrical energy to a servomotor in response to an error signal include:
   circuit means for supplying electrical energy to the motor including input and output switches for interrupting the electrical circuit between the energy supply and motor,
   first means for monitoring the electrical energy supplied to the motor and for producing a feedback signal proportional to the motor energy supplied,
   second means for comparing the error signal and the feedback signal for producing a drive signal, and
   means to actuate the motor input switch only in response to the drive signal while leaving the output switch closed thereby to regulate the speed of the servomotor while limiting the voltage buildup in the circuit means due to the inductive effect of the motor.